May 3, 1949.  E. M. HOUSEPIAN  2,468,823
CLAMP

Filed Jan. 13, 1948  2 Sheets-Sheet 1

INVENTOR.
EDGAR M. HOUSEPIAN
BY
ATTORNEY

May 3, 1949. E. M. HOUSEPIAN 2,468,823
CLAMP
Filed Jan. 13, 1948 2 Sheets-Sheet 2

INVENTOR.
EDGAR M. HOUSEPIAN
BY
ATTORNEY

Patented May 3, 1949

2,468,823

UNITED STATES PATENT OFFICE 2,468,823

CLAMP

Edgar M. Housepian, New York, N. Y.

Application January 13, 1948, Serial No. 1,992

13 Claims. (Cl. 128—346)

This invention relates to line clamps, and more particularly, although not exclusively, to surgical instruments for holding suction tubing, electrical wiring and other lines in the operative field.

In the embodiment of my invention adapted for surgical use, it is my primary objective to fill a much felt need in providing a convenient device which would obviate the use of the conventional haphazard and cumbersome method of utilizing an ordinary hemostat for clamping purposes. In the said conventional method, the hemostat pinches the sterile drape around the tube or wire, as the case may be, an operation that is time-consuming and requires extreme caution, the hemostats being frequently damaged and often causing damage to the drapes. Furthermore, the use of hemostats provides inadequate fixation and insufficient flexibility in use.

It is accordingly an important object of my invention, in the above-mentioned aspect thereof, to provide a sturdy, unitary and easily manipulable instrument which will firmly grasp both the tube or wire and the sterile drape, which will give smoother and speedier operation than, and will have none of the aforesaid shortcomings of, the conventional hemostat method now used.

It is further within the contemplation of my invention to provide a combination line and drape clamp adapted for use with suction tubing such as is employed in general surgery, and with stimulator and cautery leads and other electrical wiring used on the sterile field in neutro-surgical, orthopedic and therapeutic procedures.

Another important object of my invention is to provide a line clamp of the above-mentioned class capable of adjustable accommodation to suction tubing, electric leads or other lines of various diameters and sizes. And in this aspect of my invention it is a further object to enable the device to be applied to variously proportioned lines with a minimum of manipulative effort, and to enable it to be operatively locked into predetermined critical positions.

It is also an object of this invention, in one form thereof, to enable the clamping portion to engage the line with progressively increasing pressure so as to produce a slight pinching effect and flattening out of a rubber tube, thereby insuring a firm grip on tubing of this class; and in another form of my invention it is a further object to provide a uniform clamping effect along the extent of the clamping portion, so as to be applicable to non-compressible and non-resilient lines.

Another object is to provide, in a device of the aforesaid class, a clamping portion at a predetermined inclination to the plane of the instrument, so that a suction tubing or other line held thereby can be disposed at a 45 degree or other angle less than 90 degrees with respect to the sterile field, thereby reducing the danger of sharply bending the tube or line to the point of rupture or other injury, as often occurs with the hemostat type of clamp.

It is also within the contemplation of this invention to provide a form thereof containing two pivotly articulated jaws containing coacting clamping portions, and having resilient drape-holding or pinching portions at the terminal ends of the jaws remote from their pivotal connection, thereby presenting not only a conveniently manipulable device for simultaneously grasping both the line and the drape, but also an arrangement permitting a firm pinching of the drapes in both closed and open limiting positions of the jaws.

Still another object of my invention is to provide a simple, compact, readily constructed and inexpensive device of the above class capable of attaining the objectives above-mentioned, and further capable of being easily cleaned and sterilized.

Other objects, features and advantages will appear from the drawings and the description hereinafter given.

Referring to the drawings.

Figure 6:
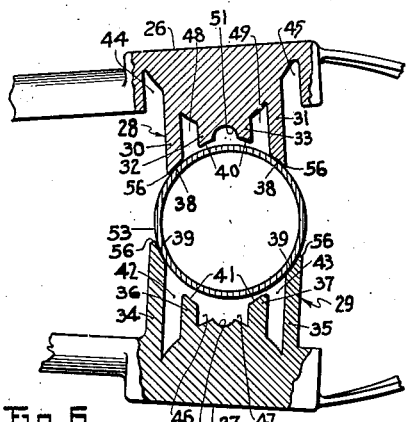
Figure 6 is an enlarged fragmentary section of Fig. 2 taken along line 6—6 thereof, showing a tube of sufficiently large diameter to be in engagement with the four outer teeth of the jaws.

The drawings illustrate the essence of my invention which includes two oppositely disposed coacting jaws containing, in facing relation, two complementary rows of interlockable teeth, certain sets of oppositely disposed teeth being so proportioned and arranged that they will engage therebetween a line (or pipe) of predetermined diameter, there being a plurality of such sets of different proportions whereby a number of lines of different diameters may be operatively accommodated. In the preferred construction, the outer sets of teeth are longer than the others, the sets becoming progressively smaller towards the center, the opposite rows of teeth being in non-interlocking positions when the jaws are separated beyond a predetermined position. Although the drawings illustrate pivotly articulated jaws, it is also within the contemplation of this invention to employ other arrangements and constructions of movable jaws providing the same relationship and proportions of the sets of teeth hereinabove described. The drawings further illustrate, in conjunction with the pivotal construction abovementioned, another essential feature for a surgical instrument, said feature comprising the use of resilient pincers extending forwardly from the jaws of the device and remote from the pivot, the two spring elements of the pincers being in pressing mutual engagement for every position of the jaws between their two extreme positions.

In the specific preferred form illustrated in the drawings, the instrument comprises two members 15 and 16 pivotly connected at 17 in scissor-like manner, the rear portions 18 and 19 of said members being in substantially one plane and containing laterally extending finger-grasping loops 20 and 21. In the device shown, the said rear portions 18 and 19 also contain inwardly extending overlapping locking bars 22 and 23, respectively, containing notches or teeth 24 and 25 in frictional slidable engagement, the teeth being preferably at predetermined critical relative positions, to maintain the forwardly disposed holding portions at certain predetermined critical positions for various sizes of lines, all as will hereinafter become more clearly apparent.

Forwardly of pivot 17 are the two coacting jaws 26 and 27 containing the two complementary rows of teeth 28 and 29, respectively, in facing relation. Each row contains a plurality of sets of teeth corresponding in number and proportions to the sets of the other row, the particular instrument illustrated having two sets of teeth on each jaw. More specifically, row 28 of jaw 26 contains one outer set consisting of teeth 30 and 31 and one inner set of shorter teeth 32 and 33, and row 29 of jaw 27 contains an outer set consisting of teeth 34 and 35, and an inner set of shorter teeth 36 and 37. In the preferred arrangement, the teeth contain inwardly disposed concave arcuate ends to accommodate lines or tubes of different predetermined diameters, as will more clearly hereinafter appear.

Figure 7:
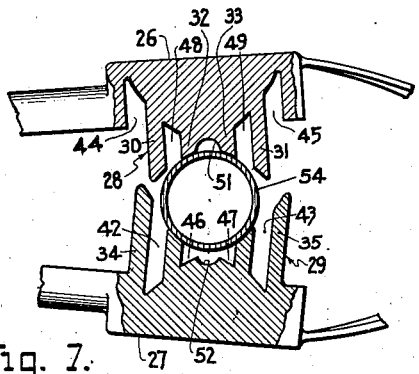
Figure 7 is a view like Fig. 6, showing a tube of smaller diameter in engagement with four inner teeth of the coacting jaws.

The said teeth are so proportioned and arranged with respect to the pivot 17 that the set consisting of teeth 30 and 31 will cooperate with the set consisting of teeth 34 and 35 so as to engage and hold therebetween a line of a predetermined maximum diameter, as indicated in Figure 6; and the set consisting of teeth 32 and 33 will cooperate with the set consisting of teeth 36 and 37 so as to engage and hold therebetween a line of a predetermined intermediate diameter, as indicated in Fig. 7. The arcuate configuration of coactive teeth terminals 38 and 39, and 40 and 41 is effective in providing maximum gripping surfaces.

As the jaws are brought closer together, there will be a loose interlocking of the teeth, outer teeth 30 and 31 entering within spaces 42 and 43, respectively, teeth 34 and 35 entering within spaces 44 and 45 in jaw 26, teeth 32 and 33 entering within spaces 46 and 47, and teeth 36 and 37 entering within spaces 48 and 49.

Figure 8:
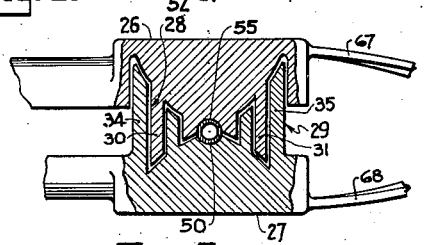
Figure 8 is a view similar to that of Fig. 6, but showing the teeth in interlocked positions and a tube of relatively small diameter operatively held in place.

It will be noted from Figure 8 that when the jaws are in their maximum closed position, a central cylindrical passageway 50 is formed by the two central semi-cylindrical coacting grooves 51 and 52 in jaws 26 and 27, respectively, to accommodate therebetween a line of predetermined minimum diameter.

Thus, according to Figures 6, 7, and 8, tubes or lines of different sizes can be operatively accommodated by the device, tube 53 representing a large diameter line, tube 54 an intermediate size line, and tube 55 a minimum diameter line. It should be observed, however, that various other sizes can be satisfactorily accommodated when only portions of the terminals engage the line, such as when outer tips 56 of the teeth, rather than the entire terminal surfaces thereof, contact and hold a tube therebetween. Furthermore, flexible tubes of diameters other than the predetermined critical diameters can be very effectively held by oppositely disposed coacting sets of teeth, due to the compressibility of such tubes.

Figure 10:
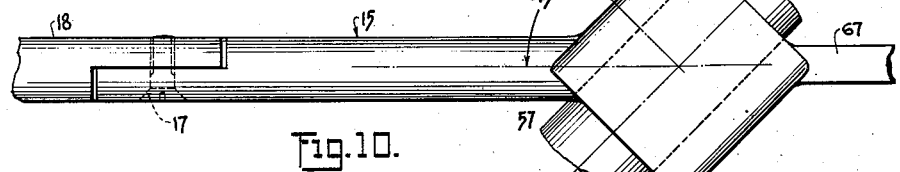
Figure 10 is a somewhat enlarged fragmentary side view of the device of Fig. 1.

In order to obviate a sharp bending of a line element held by the instrument, the said rows 28 and 29 on the coacting jaws are arranged at a predetermined inclination to the plane of the members 15 and 16, the preferred inclination being 45 degrees to said plane, as indicated in Fig. 10. The arrangement is hence such that a portion 57 of a tube 58 can rest upon the sterile drape 59, and the gripped portion of the tube can be disposed at an angle of 45 degrees, thereby avoiding the danger of a 90 degrees or other undesirable sharp bend.

Figure 12:
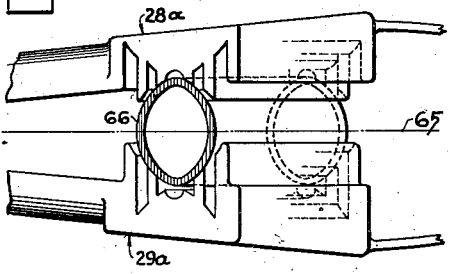
Figure 12 is a fragmentary view, substantially like that of Fig. 11, showing a modified arrangement of teeth adapted to engage an incompressible cylindrical tube.
Figure 11:
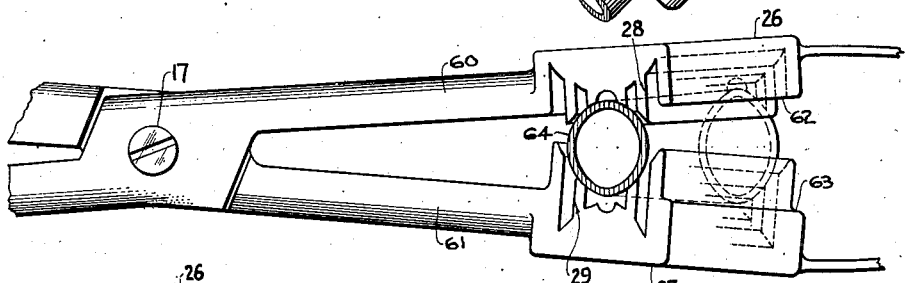
Figure 11 is a projected bottom view of Fig. 10.

In the preferred form, such as is illustrated in Figures 10 and 11, the rows of teeth 28 and 29, proportioned as above described, extend generally in the directions of the forward arms 60 and 61, respectively, the lengths of the teeth being measured from the inner base lines 62 and 63 of the coacting jaws. With this arrangement, the portion of the flexible suction tube 64 closest to the pivot 17 will obviously be somewhat compressed and flattened, whereas the portions of the tube more remote from the pivot will be progressively subject to less compression, the teeth being so proportioned that in the most forward portion of the jaws there will be no compressive action. It has been found that this slight pinching action produces a firm grip, particularly upon rubber tubing, without otherwise affecting the function of the tube. Where, however, it is desired to eliminate this pinching effect, as in the case of non-compressible tubing or wire, the construction of Fig. 12 can be employed where the teeth of rows 28a and 29a are progressively shortened forwardly, their respective heights being measured from the center line 65 extending through the pivot, as a reference axis. The teeth are so proportioned as to present a plurality of gripping terminals forming a cylindrical passageway along the extent of both rows of teeth, to operatively accommodate a cylindrical element 66.

Figure 9:
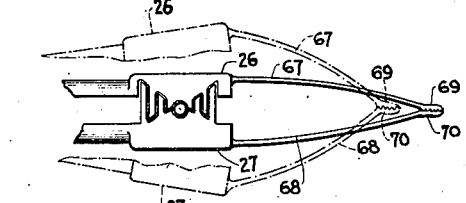
Figure 9 is a view substantially like Fig. 4, showing by full and dot-dash lines, respectively, the positions of the jaws and resilient pincers in the extreme inner and outer positions.
Figure 1:
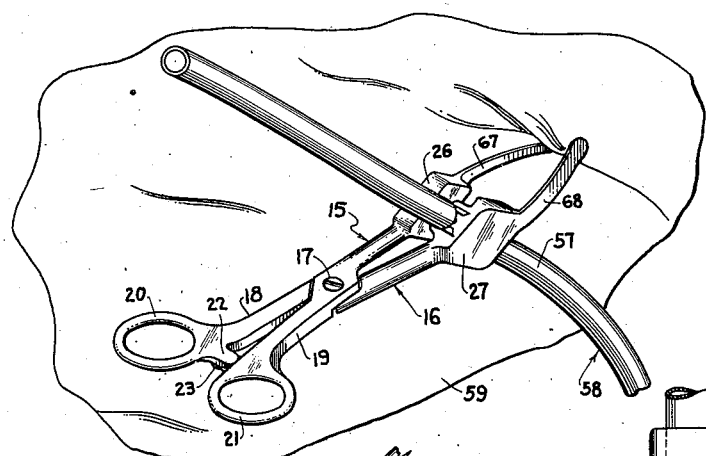
Figure 1 is a perspective view of my invention in the form of a surgical line clamp, the device being shown resting on an underlying drape in the sterile field and operatively supporting a suction tube, the device being fastened to the drape by the pinching action of the front resilient pincers.
Figure 2:
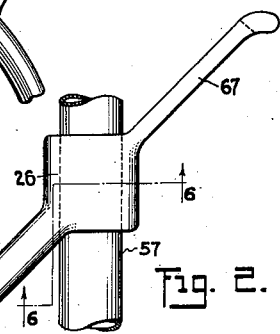
Figure 2 is a side view of the device of Fig. 1, showing a fragment of the clamped tubing.
Figure 3:
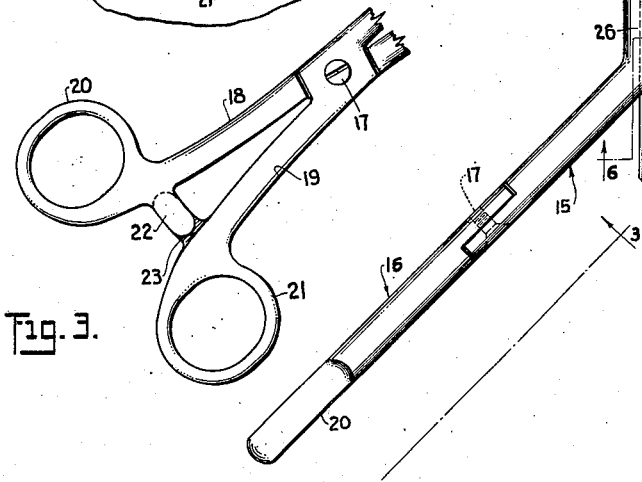
Figure 3 is a fragmentary plan view of the rear portion of the device of Fig. 2, looking normal to the plane of the instrument.
Figure 4:
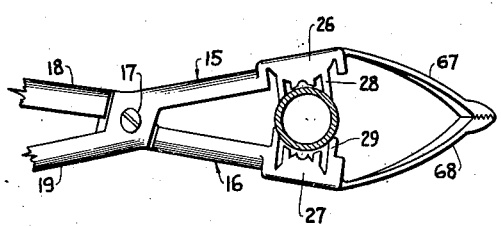
Figure 4 is a fragmentary bottom view of the front portion of the device of Fig. 2, shown in projected relation to Fig. 2.
Figure 5:
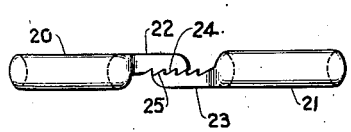
Figure 5 is a rear end view of Fig. 3.

An important element in the form of my invention adapted for use in the surgical field is the pincer device consisting of the two coacting spring pincer arms 67 and 68 extending forwardly from the jaws 26 and 27, respectively. These arms, as indicated in Fig. 9, have their terminals 69 and 70 in yieldable pressing engagement in all operative positions of the jaws, from their closed position to their position of maximum spread. The pincers, being disposed forwardly of the jaws 26 and 27 and remote from the pivot 17, enable the entire device to be effectively and easily manipulated, so that a line can be readily clamped between the jaws and the pincers attached to the drape (see Fig. 1) almost in one operation. Furthermore, the forward position of the pincers permits a maximum spread between the jaws without affecting the gripping action of the pincers. Also, the resilient action of the yieldably engaging arms 67 and 68 produces the operative locking action of the two coacting locking members 22 and 23, without the use of any other spring member.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

I claim:

1. In a line clamp of the type containing two coacting jaws movable relative to each other, a row of teeth on each jaw in facing and interlockable relation with that of the other, each row containing a plurality of sets of teeth adapted to coact with certain correspondingly positioned sets of the other row, the teeth of said coacting sets being substantially oppositely positioned and being proportioned to engage and hold therebetween a line of predetermined thickness, each set having teeth of different lengths from that of any other set of teeth on the same row, whereby lines of different thicknesses can be operatively engaged by different coacting sets.

2. In a line clamp of the type containing two coacting jaws movable relative to each other, the combination according to claim 1, the said rows each comprising one outer and at least one inner set, the teeth of each outer set being longer than the other teeth on the same row.

3. In a line clamp of the type containing two coacting jaws movable relative to each other, the combination according to claim 2, each set consisting of two teeth, the teeth of each outer set being longer than and flanking the other teeth on the same row.

4. In a line clamp of the type containing two coacting jaws movable relative to each other, a plurality of spaced teeth on each jaw, the outer teeth on each jaw being longer than the others on the same jaw, the inner teeth being progressively shorter towards the center, certain teeth on one jaw being positioned for coaction with certain oppositely positioned teeth on the other jaw, the said coacting teeth being so proportioned as to engage and hold therebetween a line of predetermined thickness.

5. In a line clamp of the type containing two coacting jaws movable relative to each other, the combination according to claim 4, certain teeth on one jaw being opposite certain spaces between teeth on the opposite jaw and being adapted to enter said spaces when the jaws are brought into proximate relation.

6. In a line clamp of the type containing two coacting jaws movable relative to each other, a row of teeth on each jaw in facing and interlocking relation with that of the other, each row containing a plurality of sets of teeth adapted to coact with certain correspondingly positioned sets of the other row, the teeth of said coacting sets being substantially oppositely positioned and being proportioned to engage and hold therebetween a line of predetermined thickness, the said opposite rows of teeth being in interlocking relation when the jaws are in predetermined proximate positions and in non-interlocking relation when the jaws are separated beyond a predetermined amount, further provided with two central semi-cylindrical coacting grooves in facing relation upon the said jaws, said grooves forming a substantially cylindrical wall when the two jaws are operatively brought together, to accommodate a line of predetermined minimum thickness.

7. In a line clamp of the class described, two pivotly connected members containing coacting jaws movable relative to each other, a row of teeth on each jaw in facing and interlockable relation with that of the other, each row containing a plurality of sets of teeth adapted to coact with certain correspondingly positioned sets of the other row, the teeth of said coacting sets being substantially oppositely positioned and being proportioned to engage and hold therebetween a line of predetermined thickness, the said jaws being disposed forwardly of the pivotal connection, the rear portions of said members containing laterally extending finger loops substantially in one plane, the said rows of teeth on the coacting jaws being arranged in a direction at a predetermined inclination to the said plane of the finger loops, whereby a line operatively held between the jaws will be disposed relative to said plane at said inclination.

8. In a line clamp of the class described, the combination according to claim 7, said inclination being 45 degrees with respect to the plane of the said finger loops.

9. In a line clamp of the class described, two pivotly connected members containing coacting jaws movable relative to each other, a row of teeth on each jaw in facing and interlockable relation with that of the other, each row containing a plurality of sets of teeth adapted to coact with certain correspondingly positioned sets of the other row, the teeth of said coacting sets being substantially oppositely positioned and being proportioned to engage and hold therebetween a line of predetermined thickness, the said rows of teeth being each arranged at an inclination to the axis of the pivotal connection, whereby the teeth of each row are at progressively different distances from said pivotal connection, coacting teeth closer to the pivotal connection being correspondingly closer together.

10. In a line clamp of the class described, two pivotly connected members containing coacting jaws movable relative to each other, a row of teeth on each jaw in facing and interlockable relation with that of the other, each row containing a plurality of sets of teeth adapted to coact with certain correspondingly positioned sets of the other row, the teeth of said coacting sets being substantially oppositely positioned and being proportioned to engage and hold therebetween a line of predetermined thickness, the said jaws being disposed forwardly of the pivotal connection, the rear portions of said members containing laterally extending finger loops, further provided with two spring-tempered pincer arms extending forwardly from the said jaws and adapted for mutual pressing engagement when the jaws are in predetermined relative positions.

11. A surgical line clamp comprising two pivotly connected members containing coacting jaws having coacting clamping surfaces in facing relation and adapted to hold therebetween lines of predetermined thicknesses, said jaws being disposed forwardly of the pivotal connection, the rear portions of the members containing laterally extending finger loops, and two spring-tempered pincer arms extending forwardly from the said jaws and adapted for mutual pressing engagement when the jaws are in predetermined relative positions.

12. A surgical line clamp according to claim 11, said finger loops being in substantially one plane, the said clamping surface extending in a direction of predetermined inclination with respect to the plane of said finger loops.

13. In a line clamp of the type containing two coacting jaws movable relative to each other, the combination according to claim 4, the terminals of said teeth being concavely curved in accordance with a predetermined configuration.

EDGAR M. HOUSEPIAN.

REFERENCES CITED

The following references are of record in the file of this patent:

UNITED STATES PATENTS

| Number | Name | Date |
| --- | --- | --- |
| 839,993 | Fritz | Jan. 1, 1907 |
| 1,106,518 | Matti | Aug. 11, 1914 |
| 2,111,161 | Wilson | Mar. 15, 1938 |